Oct. 30, 1928.　　　　　　　　　　　　　　　　　　1,689,796
E. C. MYERS
ATTACHMENT FOR TRACTORS
Original Filed June 9, 1926　　　3 Sheets-Sheet 1
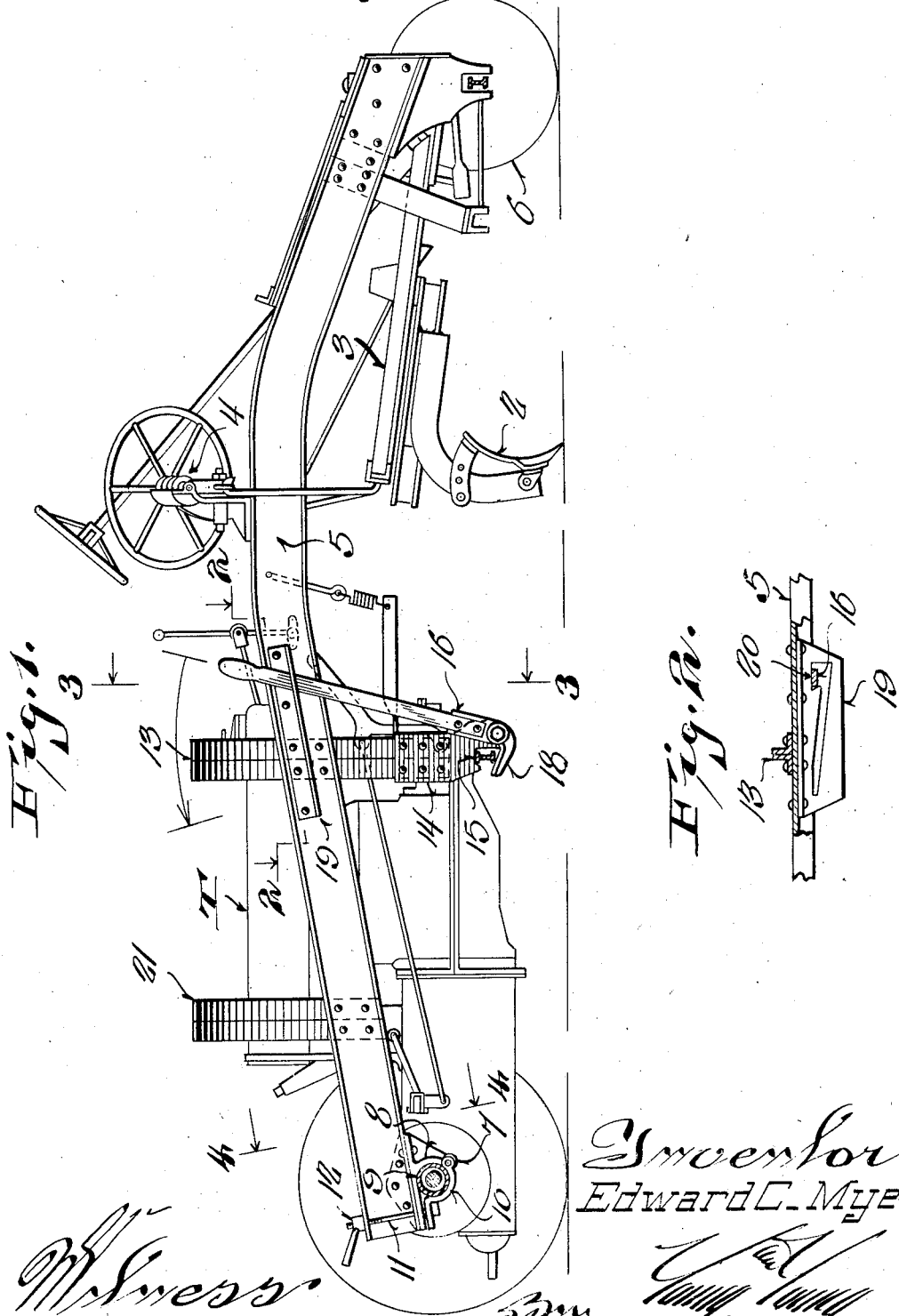

Oct. 30, 1928.

E. C. MYERS

ATTACHMENT FOR TRACTORS

Original Filed June 9, 1926     3 Sheets-Sheet 2

1,689,796

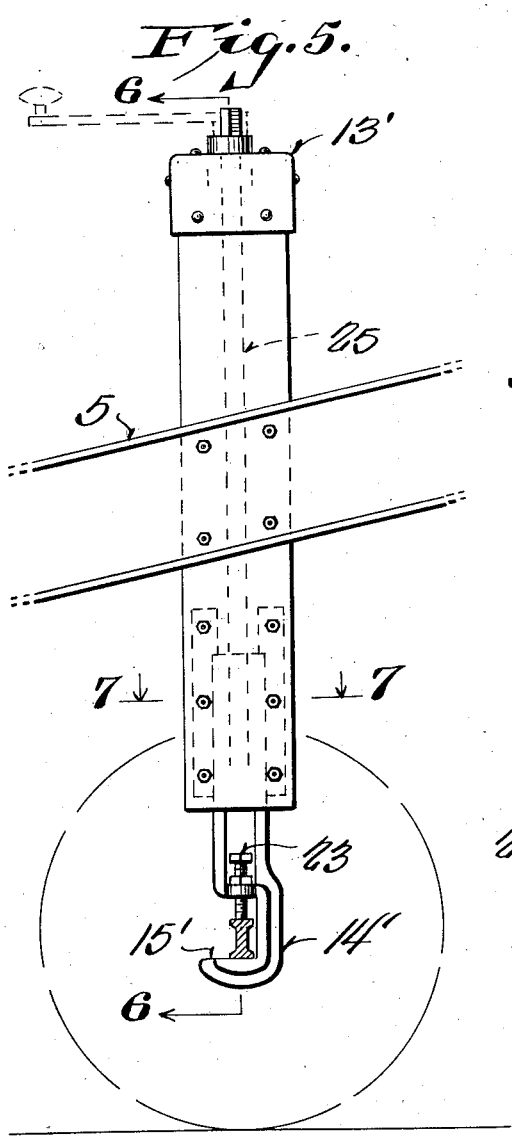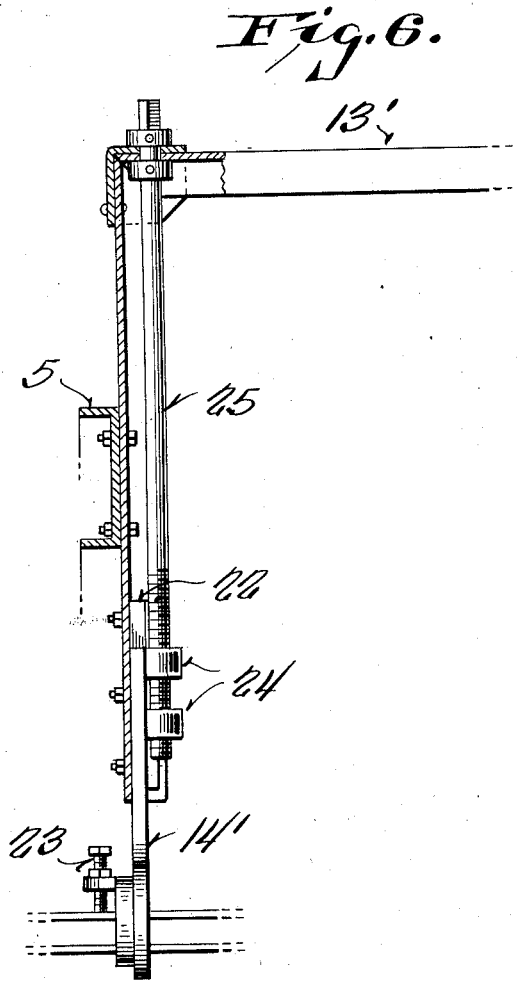

Patented Oct. 30, 1928.

1,689,796

UNITED STATES PATENT OFFICE.

EDWARD C. MYERS, OF MILWAUKEE, WISCONSIN, ASSIGNOR TO WEHR CO., OF MILWAUKEE, WISCONSIN.

ATTACHMENT FOR TRACTORS.

Application filed June 9, 1926, Serial No. 114,791. Renewed May 14, 1928.

This invention pertains to improvements in attachments for conventional types of tractors, and more particularly to an attachment designed to carry an implement or load, whereby a tractor is converted from a mere draft machine to a load carrying apparatus.

At the present time there are numerous attachments of the foregoing general character now upon the market, some of which carry working implements of various kinds, such as cultivators, grader blades, lawn mowers, road rollers, scarifiers, and the like, while others merely carry a load, but they all meet with the general objection of requiring awkward and difficult operation in their attachment or removal from the tractor.

It is therefore the primary object of the present invention to overcome the foregoing objections by the provision of an attachment for conventional types of tractors, which can be easily and quickly attached to the tractor for use, or removed therefrom when it is desired to utilize the tractor for other purposes.

Incidental to the foregoing, it is an object of the present invention to provide an attachment, of the general character described, with clamping means adapted to securely engage portions of the tractor to form a unitary structure of the tractor and attachment thus eliminating the necessity of bolting to the tractor or removing parts thereof in order to connect the attachment.

A further object is to provide an attachment, of the general character described, adapted to carry the front part of the tractor when connected with the same, with means for securely clamping any convenient part of the tractor adjacent its front end and raising the same.

A further object resides in the provision of an attachment as set forth, with means for detachably clamping the same to the front and rear of the tractor, whereby the attachment is supported at the rear of the tractor and in turn supports the front of the tractor.

A more specific object is to provide an attachment adapted to clamp upon the rear axle housing of the tractor, and to clampingly engage and raise the front axle, whereby the front of the tractor is held and supported by the attachment.

With the above and other objects in view, which will appear as the description proceeds, the invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

Figure 1 is a side elevational view of one form of attachment embodying the present invention, showing the same attached to a conventional type of tractor.

Figure 2 is a detail sectional view through a portion of the clamping mechanism, the same being taken on line 2—2 of Figure 1.

Figure 5 is a detail view of a modified form of a clamping and raising mechanism for the front end of a tractor.

Figure 6 is a front view of the same with parts broken away and in section to more clearly illustrate the structural details.

Figure 7 is a detail sectional view taken on the line 7—7 of Figure 5.

Figure 3:
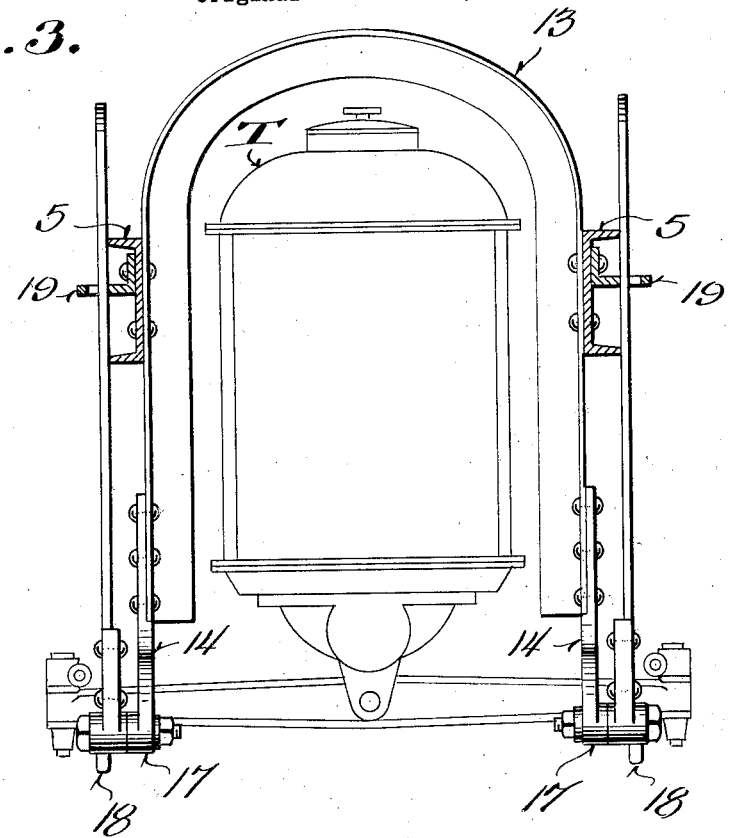
Figure 3 is a transverse section, taken on line 3—3 of Figure 1.
Figure 4:
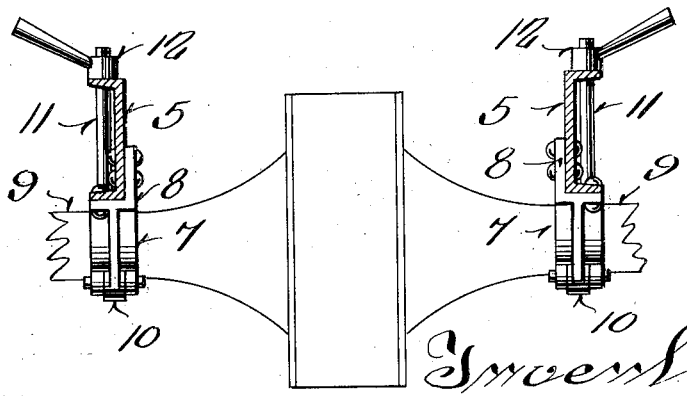
Figure 4 is a transverse section taken on the line 4—4 of Figure 1.

Referring now more particularly to the accompanying drawings, the numeral 1 designates a frame attachment for tractors, which, in the present illustration of the invention, is designed to carry an implement 2 comprising a grader blade commonly employed in grading or scraping highways. The grader blade is carried by an auxiliary frame 3 connected with the main frame attachment adjacent its front end and adjustable with relation thereto by means of conventional raising and lowering mechanism 4.

More specifically the frame attachment 1 comprises a pair of side frames 5 adapted to extend along the sides of the tractor T and project forwardly thereof, the same being supported at their forward ends by steering wheels 6.

While a particular type of attachment has been illustrated and explained, particular emphasis is laid upon the fact that the present invention is not confined to a specific structure of attachment, but is particularly directed to the manner of connecting any type of frame attachment comprising a pair of longitudinal frame members adapted to be supported at their rear ends by attachment to the rear of the tractor, and which carry means for attachment with the front end of the tractor, whereby the weight of the same is carried by the frame members. This general type of attachment may be adapted to carry various implements, such as a cultivator, plows, mowers, grader blades, and the like, or in some instances the frame members may serve to carry a load, such as a dirt or concrete bucket mounted on the frame. Also, in some cases, a road roller, lawn mower, or other form of apparatus, might be substituted for the front steering wheels 6 illustrated in the present embodiment of the invention.

Heretofore, attachments of the general character described, which are particularly designed for use in connection with that type of tractor known as the frameless tractor, have been attached to the tractor by means of bolts securing the rear ends of the frame members to the axle housing, and a yoke carried by the frames, having bolted or pinned connection with a front portion of the tractor for supporting and holding the same. In general, this requires the removal of the front axle, or other portion of the tractor, and bolting the attachment directly to the tractor. This requires an awkward and tedious operation involving considerable time and use of jacks or supports for the tractor while the same is being assembled with the attachment.

The present invention overcomes the foregoing difficulties by the provision of clamps 7 carried by the rear end of the frame members, which clamps each comprise a bracket 8 bolted to the rear end of one of the frames 5 and provided with a seat for the reception of the rear axle housing 9. Pivoted to the bracket 9 is a clamp 10 adapted to cooperate with the bracket to securely engage the rear axle housing 9, this being brought about by means of a bolt 11 passing through the free end of the clamp 10 and the frame 5, the bolt being provided with a hand nut 12 threaded on its upper end.

Intermediate the ends of the frames 5 and connecting the same, is an inverted U-shaped yoke 13, the ends of which depend below the frame and have bolted thereto, or secured in any suitable manner the brackets 14 projecting below the frames and each being provided with a mouth 15, for the reception of the front axle of the tractor.

Cooperating with the mouth 15, and adapted to securely lock the axle of the tractor in the same, is a pivoted lever 16 carried by the depending portion 17 of the bracket 14, which lever is provided with a lateral arm 18 adapted to engage the underside of the axle and hold the same firmly within the mouth of the bracket 14.

The upper end of the lever 14, which comprises a handle, passes through a slotted plate 19 secured to the side of the frame 5, the slot being provided with a notch 20 adapted to lock the lever in its clamping position.

In that embodiment of the invention illustrated, the controls of the tractor are brought forward and attached to suitable levers carried by the attachment, but inasmuch as this forms no specific part of the present invention, it is considered unnecessary to go into a detailed explanation of the same, these structures being old and well-known in the art.

To serve as an additional bracing means for the rear ends of the frame members and to hold them in proper alinement, an auxiliary inverted U-shaped yoke 21 is provided, having its ends bolted, or otherwise suitably secured, to the frames 5, and the top being of sufficient height to clear the top of the tractor similar to the yoke 13.

To connect the attachment to the tractor or remove the same therefrom, it is simply necessary in the present instance to lower the grader blade sufficiently to support the rear ends of the frames 5 at the proper height for the reception of the rear axle housing 9 of the tractor, it being understood that the front and rear clamps 7, and those carried by the yoke 13, are open. The tractor is then run forwardly between the frames 5 to a point where the front axle of the tractor enters the mouths 15 of the brackets 14 and the rear axle housings enter the clamps 7. The levers 16 are then moved to their forward position and locked within the notch 20. During this operation the clamping arms 18 engage the axle of the tractor and raise the same to a point where it is locked within the mouths 15 and the weight of the front end of the tractor is removed from the ground, causing the same to be applied to the attachment. Should it then be desired the front wheels carried by the axle may be removed as they serve no purpose. It will, however, be appreciated that while this is desirable, it is not essential to the operation. The tractor controls can then be connected with the controls carried by the attachment in the usual manner. To remove the attachment from the tractor, the reverse operation is required.

While one specific form of mechanism has been shown and described, for detachably clamping the front axle of the tractor and raising the same, it will be understood that various other modifications are contemplated for accomplishing the same result, such as the form shown in Figures 5, 6, and 7, it being the intention to include any means for clamping and raising the front portion of the tractor, whereby quick attachment or removal is obtained, and which will apply the weight of the front end of the tractor upon the attachment when connected.

Referring more particularly to the modification illustrated in Figures 5, 6, and 7, it will be noted that yoke 13' is constructed of ordinary iron and has secured to the arms thereof the guides 22 in which are slidably mounted brackets 14'. The lower extremities of the brackets 14' are provided with mouths 15' for the reception of the front axle of the tractor, and set studs 23 carried by the brackets serve to lock the front axle of the tractor within the mouths 15'.

The upper portions of the brackets 14' are provided with ears 24' for the reception of the threaded shafts 25 rotatably carried by the yoke 13'. The upper end of the shafts 25 are squared for the reception of a handle, or other suitable tool.

In the operation of the preferred form of the clamping means just described, the front axle of the tractor is run into the mouths 15' of the brackets 14', the brackets being previously adjusted to the proper height. Thereafter the brackets are raised to a height sufficient to support the weight of the front end of the tractor and the axle is then locked within the brackets 14' by means of the set studs 23. The reverse operation is followed to remove the tractor from the attachment.

From the foregoing description, taken in connection with the drawings, it will be obvious that simple and efficient means have been provided, whereby an attachment can be quickly and securely connected with the conventional type of frameless tractor, or removed therefrom.

I claim:—

1. An attachment for tractors comprising a pair of frame members adapted to extend along opposite sides of a tractor, steering means for supporting the front end of the frame members, means for clamping the rear end of the frame members to the rear end of the tractor, and movable clamps carried by the frame members for engaging and raising the front axle of the tractor.

2. An attachment for tractors comprising a pair of frame members adapted to extend along opposite sides of a tractor, steering means for supporting the front end of the frame members, means for clamping the rear end of the frame members to the rear axle housing of the tractor, laterally spaced brackets carried by the frame members for the reception of the front axle of the tractor adjacent the ends of said front axle, and means for locking the axle in said brackets.

3. An attachment for tractors comprising a pair of frame members adapted to extend along opposite sides of the tractor, steering means for supporting the front end of the frame members, means for clamping the rear end of the frame members to the rear axle housing of the tractor, a pair of brackets slidably carried by the frame members and practically adjustable with relation thereto, and means for clamping the front axle to the tractor in said brackets.

4. An attachment for tractors comprising a pair of frame members adapted to extend along opposite sides of a tractor, steering means for supporting the front ends of the frame members, means for clamping the rear ends of the frame members to the rear axle housing of the tractor, a pair of brackets slidably carried by the frame members for the reception of the front axle of the tractor, means for vertically adjusting said brackets to support the front end of the tractor, and means for clamping the front ends of the tractor in said brackets.

5. An attachment for tractors comprising a pair of frame members adapted to extend along opposite sides of the tractor, steering means for supporting the front end of the frame members, means for clamping the rear end of the frame members to the rear axle housing of the tractor, a pair of vertical arms carried by the frame members, a bracket slidably mounted on each of said arms for the reception of the front axle of the tractor, means for clamping the axle in said brackets, and means for adjusting said brackets on said arms.

6. An attachment for tractors comprising a pair of frame members adapted to extend along opposite sides of a tractor, steering means for supporting the front end of the tractor, means for clamping the rear ends of the frame members to the rear axle housing of the tractor, a yoke carried by the frame members, a bracket slidably carried by each arm of said yoke for the reception of the front axle of the tractor, means for clamping the axle in said brackets, and threaded shafts carried by said yoke for vertically adjusting each bracket with relation thereto.

7. An attachment for tractors comprising a pair of frame members adapted to extend along opposite sides of a tractor, steering means for supporting the front end of the frame members, means for clamping the rear end of the frame members to the axle housing, a yoke carried by the frame members, and means carried by said yoke for clamping and raising the front end of said tractor, whereby the rear wheels of the tractor are unchanged and may be used for supporting and propelling said attachment.

8. An attachment for tractors comprising a pair of frame members adapted to extend along opposite sides of a tractor, steering means for supporting the front end of the frame members, means for clamping the rear end of said frame members to the rear axle housing of the tractor, an inverted U-shaped yoke carried by the frame members and adapted to surround said tractor, and means carried by said yoke for clamping and raising the front end of the tractor.

9. An attachment for tractors comprising a pair of frame members adapted to extend along opposite sides of a tractor, steering means for supporting the front end of the frame members, means for clamping the rear end of said frame members to the rear axle housing of the tractor, an inverted U-shaped yoke carried by the frame members and adapted to surround said tractor, and means carried by said yoke for clamping and raising the front axle of the tractor.

10. An attachment for tractors comprising a pair of frame members adapted to extend along opposite sides of a tractor, steering means for supporting the front end of the frame members, means for clamping the rear end of said frame members to the rear axle housing of the tractor, an inverted U-shaped yoke carried by the frame members, means carried by said yoke for clamping and raising the front end of the tractor, and an auxiliary inverted U-shaped yoke for connecting and bracing the rear ends of said frame members.

In testimony that I claim the foregoing I have hereunto set my hand at Milwaukee, in the county of Milwaukee and State of Wisconsin.

EDWARD C. MYERS.